United States Patent
Sarkissian et al.

(10) Patent No.: US 11,500,072 B2
(45) Date of Patent: Nov. 15, 2022

(54) PHOTONIC CIRCULATOR FOR A LIDAR DEVICE

(71) Applicant: GM GLOBAL TECHNOLOGY OPERATIONS LLC, Detroit, MI (US)

(72) Inventors: Raymond Sarkissian, Studio City, CA (US); Keyvan Sayyah, Santa Monica, CA (US); Biqin Huang, Rancho Palos Verdes, CA (US); Ivan Alvarado, Santa Monica, CA (US); Shuoqin Wang, Westlake, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 310 days.

(21) Appl. No.: 16/814,575

(22) Filed: Mar. 10, 2020

(65) Prior Publication Data
US 2021/0124024 A1 Apr. 29, 2021

Related U.S. Application Data

(60) Provisional application No. 62/927,254, filed on Oct. 29, 2019.

(51) Int. Cl.
*G01S 7/481* (2006.01)
*G01S 7/4911* (2020.01)
(Continued)

(52) U.S. Cl.
CPC .......... *G01S 7/4818* (2013.01); *G01S 7/4813* (2013.01); *G01S 7/4814* (2013.01); *G01S 7/4815* (2013.01);
(Continued)

(58) Field of Classification Search
CPC .... G01S 7/4818; G01S 7/4813; G01S 7/4814; G01S 7/4815; G01S 7/4816;
(Continued)

(56) References Cited

U.S. PATENT DOCUMENTS

| 8,121,450 B2 | 2/2012 | Webster et al. |
| 2013/0209033 A1 | 8/2013 | Luff et al. |

(Continued)

FOREIGN PATENT DOCUMENTS

WO    WO-2017190064 A2 * 11/2017

OTHER PUBLICATIONS

NPL1 (Yttrium iron garnet) (Year: 2021).*
(Continued)

*Primary Examiner* — Yuqing Xiao
*Assistant Examiner* — Sanjida Naser
(74) *Attorney, Agent, or Firm* — Quinn IP Law

(57) ABSTRACT

A photonic circulator deployed on a chip-scale light-detection and ranging (LiDAR) device includes a first arm that includes a first waveguide that is bonded onto a first member at a first bonding region, and a second arm that includes a second waveguide that is bonded onto a second member at a second bonding region. A first thermo-optic phase shifter is arranged on the first member and collocated with the first waveguide, and a second thermo-optic phase shifter is arranged on the second member and collocated with the second waveguide. The magneto-optic material and the first thermo-optic phase shifter of the first member cause a first phase shift in a first light beam travelling through the first waveguide, and the magneto-optic material and the second thermo-optic phase shifter of the second member cause a second phase shift in a second light beam travelling through the second waveguide.

19 Claims, 4 Drawing Sheets

(51) Int. Cl.
  *G01S 7/4912* (2020.01)
  *G01S 17/88* (2006.01)
  *G02B 6/12* (2006.01)
  *G02B 6/122* (2006.01)
  *G01S 17/10* (2020.01)
  *B60R 11/00* (2006.01)

(52) U.S. Cl.
  CPC .......... *G01S 7/4816* (2013.01); *G01S 7/4817* (2013.01); *G01S 7/4911* (2013.01); *G01S 7/4916* (2013.01); *G01S 17/10* (2013.01); *G01S 17/88* (2013.01); *G02B 6/12004* (2013.01); *G02B 6/1228* (2013.01); *B60R 11/00* (2013.01); *G02B 2006/1215* (2013.01); *G02B 2006/12061* (2013.01); *G02B 2006/12097* (2013.01); *G02B 2006/12121* (2013.01); *G02B 2006/12147* (2013.01)

(58) Field of Classification Search
  CPC .... G01S 7/4817; G01S 7/4911; G01S 7/4916; G01S 17/10; G01S 17/88; G01S 17/34; G01S 7/4812; G02B 6/12004; G02B 6/1228; G02B 2006/12061; G02B 2006/12097; G02B 2006/12121; G02B 2006/12147; G02B 2006/1215; B60R 11/00
  See application file for complete search history.

(56) References Cited

U.S. PATENT DOCUMENTS

| | | | |
|---|---|---|---|
| 2014/0376001 A1* | 12/2014 | Swanson | G01N 21/17 356/479 |
| 2018/0120433 A1 | 5/2018 | Eichenholz et al. | |
| 2019/0018110 A1 | 1/2019 | Kremer et al. | |
| 2019/0018114 A1 | 1/2019 | Patterson et al. | |
| 2019/0018120 A1 | 1/2019 | Efimov et al. | |
| 2019/0018139 A1 | 1/2019 | Sayyah et al. | |
| 2019/0018198 A1 | 1/2019 | Sayyah et al. | |
| 2019/0235053 A1 | 8/2019 | Spector | |
| 2019/0302268 A1 | 10/2019 | Singer et al. | |
| 2019/0302269 A1 | 10/2019 | Singer et al. | |
| 2019/0391406 A1 | 12/2019 | Chen | |
| 2020/0011994 A1 | 1/2020 | Thorpe et al. | |
| 2020/0049801 A1 | 2/2020 | Sayyah et al. | |

OTHER PUBLICATIONS

Jacques, Samani, El-Fiky, Patel, Xing, Plant; Optimization of thermo-optic phase-shifter design and mitigation of thermal crosstalk on the SOI platform; Optics Express 10456; vol. 27, No. 8; Apr. 15, 2019.
Sacher, Mikkelsen, Huang, Mak, Yong, Luo, Li, Dumais, Jiang, Goodwill, Bernier, Lo, Poon Monolithically Integrated Multilayer Silicon Nitride-on-Silicon Waveguide Platforms for 3-D Photonic Circuits and Devices; IEEE vol. 106, No. 12; Dec. 2018.
Komljenovic, Bowers; Monolithically Integrated High-Q Rings for Narrow Linewidth Widely Tunable Lasers; IEEE vol. 51, No. 11; Nov. 2015.

* cited by examiner

PHOTONIC CIRCULATOR FOR A LIDAR DEVICE

CROSS-REFERENCE TO RELATED APPLICATIONS

This application claims the benefit of U.S. Provisional Patent Application No. 62/927,254 filed on Oct. 29, 2019, the disclosure of which is hereby incorporated by reference.

INTRODUCTION

Light-detection and ranging (LiDAR) is an optical remote sensing technology that operates to acquire positional information of objects in a surrounding environment employing a light emitter and a light sensor. Operation of a LiDAR device includes illuminating objects in the surrounding environment employing light emitted from a light emitter, detecting light scattered by the objects using a light sensor such as a photodiode, and determining range of the objects based on the scattered light. A LiDAR device may employ light in the form of a pulse-modulated, frequency-modulated, or phase-modulated laser to measure ranges and other parameters of selected objects.

Photonic circulators are commonly utilized in optical communication systems and optical measurement systems such as a LiDAR device. A photonic circulator is a multi-port input-output non-reciprocal optic device that allows optical signals to be transmitted only sequentially along a specified port, such that when an optical signal is input from a specified port, it can only be output from another specific port. This transmission characteristic enables the photonic circulator to be employed in two-way communication systems to separate the optical signals of forward transmission and reverse transmission in the same optical fiber, thereby achieving bidirectional communication in a single optical fiber.

Nonreciprocal photonic devices, including optical isolators and circulators, are employed to break the time-reversal symmetry of light propagation to provide optical isolation and circulation in a photonic system, which is used to stabilize the laser operation or simplify the optical system design. In integrated photonic systems, optical nonreciprocity is achieved by using magneto-optical (MO) materials, in which time-reversal symmetry is broken by applying a magnetic field across the MO material to achieve macroscopic spin and orbital alignment and nonreciprocal electric dipole transitions. In a discrete optical isolator device, the magnetic field is applied coaxially with the light propagation direction, which yields a nonreciprocal rotation of the polarization of linearly polarized light, namely the Faraday effect.

SUMMARY

A photonic circulator is described, an application of which may be deployed on a chip-scale light-detection and ranging (LiDAR) device. The photonic circulator includes a first arm that includes a first waveguide that is bonded onto a first member at a first bonding region, and a second arm that includes a second waveguide that is bonded onto a second member at a second bonding region. The first bonding region of the first waveguide has a first characteristic length that is non-reciprocal to, i.e., differs from a second characteristic length associated with the second bonding region of the second waveguide, which is also non-reciprocal. A first thermo-optic phase shifter is arranged on the first member and collocated with the first waveguide, and a second thermo-optic phase shifter is arranged on the second member and collocated with the second waveguide. One or a plurality of metal pads are employed, along with a first directional coupler and a second directional coupler. The first member and the second member are fabricated from a magneto-optic material. The magneto-optic material and the first thermo-optic phase shifter of the first member cause a first phase shift in a first light beam travelling through the first waveguide, and the magneto-optic material and the second thermo-optic phase shifter of the second member cause a second phase shift in a second light beam travelling through the second waveguide. A third thermo-optic phase shifter on the first waveguide may be incorporated to enable a change in the reciprocal phase-shift.

An aspect of the disclosure includes the magneto-optic material being bonded to only cover a portion of the first waveguide and a portion of the second waveguide whereat a direction of propagation of light is perpendicular to an external magnetic field that is exerted in plane with the magneto-optical material.

Another aspect of the disclosure includes the first and second phase shifters being incorporated to fine tune the first and second phase shifts under the bonded magneto-optic material and the metal contacts being located outside of the bonding region.

Another aspect of the disclosure includes the first and second phase shifts being non-reciprocal.

Another aspect of the disclosure includes a third thermo-optic phase shifter being implemented on the first waveguide to effect fine-tuning of reciprocal phase shift.

Another aspect of the disclosure includes the first arm including the first waveguide being bonded onto the first member at the first bonding region, and the second arm including the second waveguide being bonded onto the second member at the second bonding region to form an asymmetric Mach-Zehnder interferometer.

Another aspect of the disclosure includes the first bonding region being larger than the second bonding region.

Another aspect of the disclosure includes the first waveguide being a silicon photonic waveguide that includes magneto-optic material being employed as upper cladding thereon.

Another aspect of the disclosure includes the magneto-optic material being a magneto-optical garnet that is employed as a cladding layer material.

Another aspect of the disclosure includes the magneto-optical garnet being $(CeY)_3Fe_5O_{12}$.

Another aspect of the disclosure includes the magneto-optic material of the first member and the magneto-optic material of the second member applying magnetic fields in anti-parallel directions.

Another aspect of the disclosure includes the magnetic field being generated externally employing an electro-magnet.

Another aspect of the disclosure includes the magnetic field being generated by depositing permanent magnetic materials on top of the magneto-optic material.

Furthermore, an architecture for a chip-scale optical phased array-based scanning frequency-modulated continuous wave (FMCW) light-detection and ranging (LiDAR) device is described. The LiDAR device may be arranged to monitor a field of view. The LiDAR device includes a laser, a transmit optical splitter, a photonic circulator, a photodetector, and an optical phased array. The laser, the transmit optical splitter, the photonic circulator, the photodetector, and the optical phased array are arranged as a chip-scale package on a single semiconductor device. The laser generates a first light beam that is transmitted to an aperture of the optical phased array via the transmit optical splitter, the photonic circulator, and the optical phased array. The first light beam is transmitted to the photodetector via the transmit optical splitter, the aperture of the optical phased array captures a second light beam that is transmitted to the photodetector via the optical phased array and the photonic circulator.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of optical, mechanical and electrical hardware, sensors, controllers, application-specific integrated circuits (ASIC), combinatorial logic circuits, software, firmware, and/or other components that are arranged to provide the described functionality.

Figure 1:
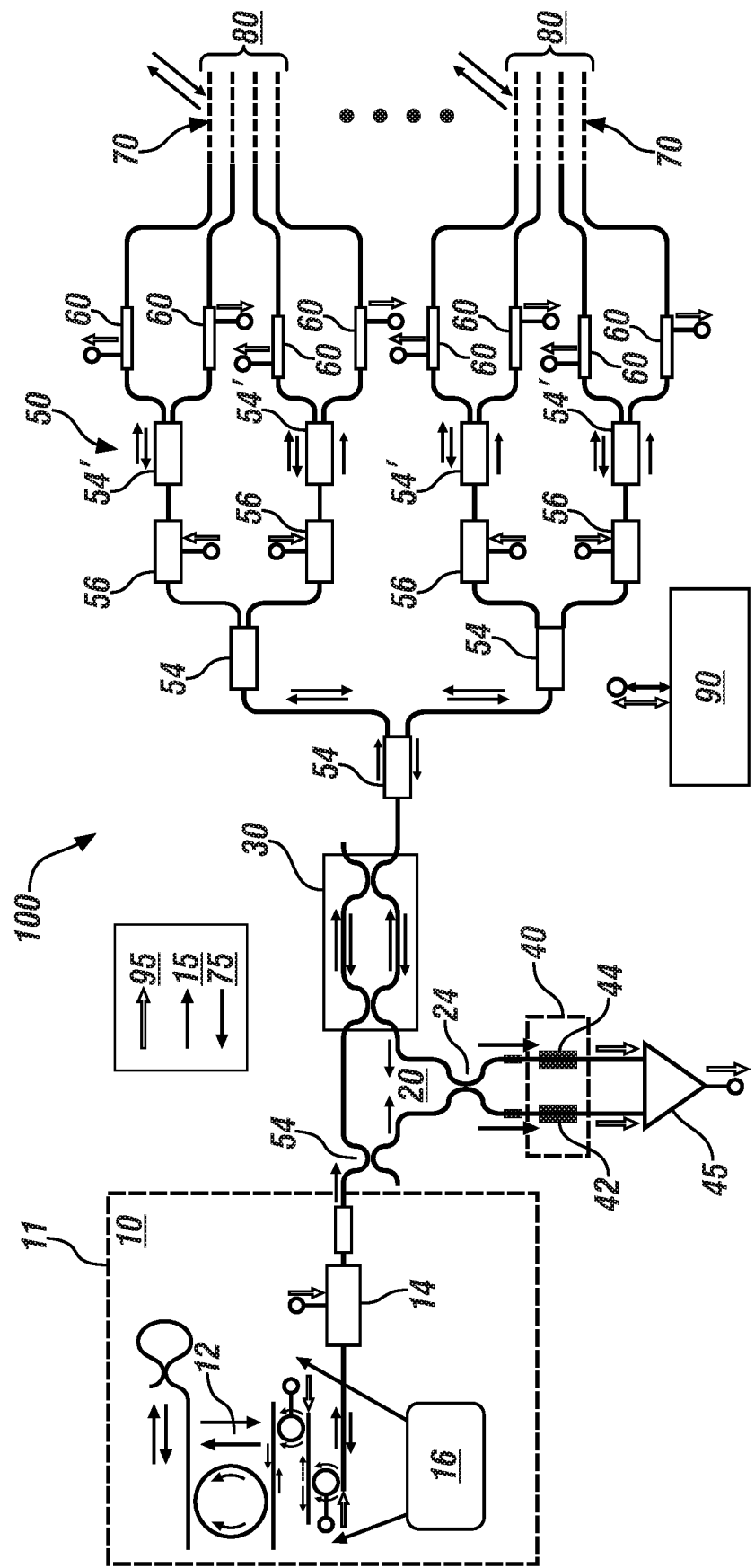
FIG. 1, schematically illustrates an embodiment of a light detection and ranging (LiDAR) device, in accordance with the disclosure.

Referring to the drawings, wherein like reference numerals correspond to like or similar components throughout the several Figures, FIG. 1, consistent with embodiments disclosed herein, schematically illustrates an embodiment of a light detection and ranging (LiDAR) device 100. The LiDAR device 100 described herein is configured as a chip-scale optical phased array based frequency-modulated continuous wave (FMCW) LiDAR device with features that include a single transmit and receive optical phase array (OPA) aperture enabled by the integration of a chip-scale photonic circulator. This configuration reduces the chip footprint as compared to other systems. The LiDAR device 100 includes an array of fully-integrated semiconductor optical amplifiers (SOA) that are distributed among the array elements resulting in a power-scalable LiDAR transmitter and receiver. The LiDAR device 100 also includes a widely tunable (~100 nm), fully-integrated, narrow linewidth master laser, which enables wide angle scanning in the off-chip direction parallel to the OPA antennas. In an embodiment of this architecture, a mixed Si and SiN integrated photonic platform is used enabling the co-integration of the narrow linewidth laser source together with active Si photonic components such as Ge-on-Si photodiodes. Such a configuration may enable a mm-size OPA with mm-long optical antennas that transmits beams with very low divergence (<0.1°) with no free-space optics. Such a configuration may also enable implementation of a pseudo-random OPA, which results in LiDAR transmit beams with no grating lobes, hence reducing the complexity of FMCW beat signal detection and interpretation, and a compact (<1 cm$^2$) LiDAR sensor that may be enabled by the full integration of the laser, photonic circulator and scanning mechanism in a single chip transmit/receive LiDAR aperture implementation.

Referring again to FIG. 1, one embodiment of the LiDAR device 100 is schematically illustrated, including a laser 10, a transmit optical splitter 20, photonic circulator 30, a set of photodetectors 40, including photodetectors 42 and 44 in one embodiment, and an optical phased array 50. The laser 10, the transmit optical splitter 20, the photonic circulator 30, the set of photodetectors 40, and the optical phased array 50 are arranged as a chip-scale package on a single semiconductor substrate. The laser 10 generates a transmitted light beam 15 that is transmitted to an aperture 80 of the optical phased array 50 via the transmit optical splitter 20, the photonic circulator 30, and the optical phased array 50. The laser 10, the transmit optical splitter 20, the photonic circulator 30, the optical phased array 50, and the aperture 80 are interconnected via optical waveguides. A controller 90 is arranged to monitor and control various elements of the LiDAR device 100, with electrical signals employed for communication with the controller 90. Electrical signal communication between the controller 90 and the LiDAR device 100 is indicated by arrows 95.

The transmitted light beam 15 is transmitted to the set of photodetectors 40 via transmit optical splitter 20 via optical waveguides. The aperture 80 of the optical phased array 50 captures a second, received light beam 75 that is transmitted to the set of photodetectors 40 via the optical phased array 50 and the photonic circulator 30. The aperture 80 interconnects via the optical phased array 50 to the set of photodetectors 40 via optical waveguides.

The LiDAR device 100 is arranged as a chip-scale package. A chip-scale package (CSP) is an optical and electronic integrated circuit package that includes surface-mount technology, and whose surface area is not more than 1.2 times an original die area. There are many benefits associated with chip-scale packages. Size reduction of the package compared to traditional packages is enabled due to flip-chip mounting of the OPA electronic driver application specific integrated circuit (ASIC) chip to the OPA electrical contact ports, indicated by numeral 11. Another advantage associated with this chip-scale package approach is self-alignment characteristics and the lack of bent leads, features which further help in lowering the manufacturing time and steps.

The laser 10 is a widely tunable (~100 nm), fully-integrated, narrow linewidth master laser 10, and in one embodiment is configured as a scanning frequency modulated continuous wave (FMCW) LiDAR optical transmitter. The laser 10 includes a tunable high-Q laser resonator 12, a tunable laser controller 16, and a semiconductor optical gain chip 14, which feeds via a 1×2 splitter 54 into the photonic circulator 30 and the set of photodetectors 40 via the 2×2 coupler 24. The tunable high-Q laser resonator 12 includes, in one embodiment, a micro-ring or a waveguide grating-based high quality factor (Q) integrated optical resonator.

The set of photodetectors 40 includes photodetectors 42 and 44, which are arranged in a dual balanced photodetector configuration set and connected to a trans-impedance amplifier 45.

The trans-impedance amplifier 45 is in communication with the photodetectors 42 and 44, and generates an output signal that is communicated to the controller 90.

The transmit optical splitter 20 directs the transmitted light beam 15 generated by the laser 10 to the optical phased array 50 via the photonic circulator 30, and directs the local oscillator light beam 15 generated by the laser 10 to the set of photodetectors 40.

The photonic circulator 30 is configured as a chip-scale component that separates optical signals that travel in opposite directions in the optical waveguides connected to it. The photonic circulator 30 is a three- or four-port optical device designed such that light entering one port exits from the adjacent port. Photonic circulators are used to separate optical signals that travel in opposite directions in an optical medium (such as optical fiber or waveguide), for example to achieve bidirectional transmission over a single fiber or waveguide. The photonic circulator 30 may include an integrated photonic circulator 30 that includes an unbalanced Mach-Zehnder or micro-ring resonator based photonic circulator 30 that is integrated with a magneto-optical material. The operation wavelength of the integrated photonic circulator 30 is tunable using an electro-optic or a thermo-optic effect induced in its optical waveguide(s).

The optical phased array 50 captures the second, received light beam 75 that is transmitted to the photonic circulator 30, and the photonic circulator 30 directs the received light beam 75 to the set of photodetectors 40. In one embodiment, the optical phased array 50 may be configured as an integrated two-dimensional scanning optical phased array (OPA) with a fully integrated photonic integrated circuit (PIC). Phased-array optics is the technology of controlling the phase and amplitude of light waves transmitting, reflecting, or received by a two-dimensional surface using adjustable surface elements. An optical phased array (OPA) is the optical analog of a radio wave phased array. By dynamically controlling the optical properties of a surface on a microscopic scale, the light beams are steered into an OPA transmitter, or the view direction of sensors in an OPA receiver, without moving parts. Phased array beam steering is used for optical switching and multiplexing in optoelectronic devices, and for aiming laser beams. The PIC facilitates integrating, for example, lasers, modulators, detectors, and filters on a single semiconductor, typically silicon or indium phosphide.

The optical phased array 50 includes a plurality of 1×2 optical splitters 54 a plurality of semiconductor optical amplifiers 56, a plurality of phase shifters 60, a plurality of optical antennas 70, and the aperture 80, all of which are interconnected by optical waveguides. The aperture 80 is arranged as a single transmit and receive aperture. Scanning in the direction perpendicular to the antennas of the OPA are enabled by the phase control of the phase shifters 60, and in the direction parallel to the antennas are enables via wavelength control of the tunable laser 10.

The optical phase array 50 is configured as follows in this embodiment. A first of the 1×2 optical splitters 54 interconnects with the photonic circulator 30, and is connected in series with a pair of the 1×2 optical splitters 54 and arranged in a cascaded configuration of N branches. The outputs of the pairs of a number of the 1×2 optical splitters 54 are each connected to one of the semiconductor optical amplifiers 56, which are connected to a second set of the 1×2 optical splitters 54', each which feeds into one of a plurality of phase shifters 60, which lead into respective optical antennas 70. The semiconductor optical amplifiers 56 and the phase shifters 60 communicate with and are controlled by the controller 90. It should be noted that is some embodiments, the semiconductor optical amplifiers 56 are also placed in the higher order splits of the optical phased array in order to produce a higher transmit optical power level.

The plurality of optical antennas 70 are mm-long optical antennas that include grating couplers with uniform near-field emission patterns. Each of the plurality of optical antennas 70 operates as a transmit antenna and as a receive antenna.

The semiconductor optical amplifiers (SOAs) 56 of the optical phased array 50 are arranged to generate a power-scalable optical phased array. The SOAs 56 of the optical phased array 50 are controllable to vary signal intensity of the transmitted light beam 15 that is generated by the laser 10. The SOAs 56 of the optical phased array 50 are controllable to vary signal intensity of the received light beam 75 as well.

The plurality of optical antennas 70 of the optical phased array 50 are fed coherent signals having intensities that vary based upon the SOAs 56.

The laser 10, the transmit optical splitter 20, the photonic circulator 30, the set of photodetectors 40, and the optical phased array 50 are arranged on a single semiconductor substrate. This includes the laser 10, the transmit optical splitter 20, the photonic circulator 30, the set of photodetectors 40, and the optical phased array 50 being arranged on a silicon integrated photonic platform that is fabricated from mixed silicon and silicon nitride in one embodiment. A feedback circuit provides for the tunable laser wavelength control and stabilization.

Figure 2:
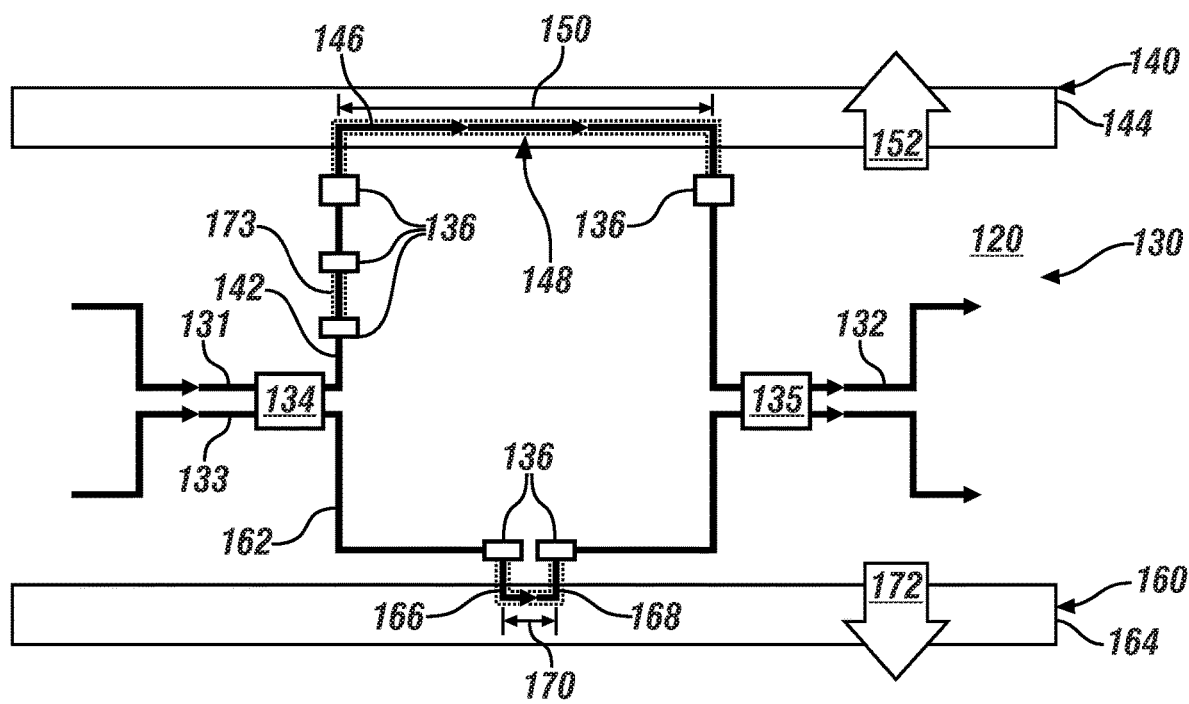
FIG. 2 schematically illustrates an embodiment of an photonic circulator that is configured as an integrated photonic component that separates optical signals that travel in opposite directions in an optical waveguide, in accordance with the disclosure.

FIG. 2 schematically illustrates photonic circulator 130, which is an embodiment of the photonic circulator 30 that is described with reference to FIG. 1, and is configured as an integrated photonic component that separates optical signals that travel in opposite directions in an integrated photonic circuit, e.g., an optical waveguide. The photonic circulator 130 is implemented on a silicon substrate 120, and is configured as an integrated photonic circulator design that incorporates a CeYIG layer to minimize losses while independently varying non-reciprocal characteristic lengths corresponding to first and second arms. The photonic circulator 130 is configured as an asymmetric Mach-Zehnder interferometer in one embodiment.

The photonic circulator 130 includes a first port 131, a second port 132, a third port 133, a first directional coupler 134, a second directional coupler 135, a plurality of metal pads 136, a first arm 140 including a first waveguide 142, and a second arm 160 including a second waveguide 162, which are arranged on or otherwise disposed on the silicon substrate 120. The first and second waveguides 142, 162 are routed in parallel through each of the first and second directional couplers 134, 135. In one embodiment, the photonic circulator 130 is configured as an asymmetric Mach-Zehnder interferometer, as described herein. The elements of the photonic circulator 130 are arranged such that light coupled to the first port 131 appears in the second port 132 while the light coupled to the second port 132 appears in the third port 133 with minimal leakage and cross-port coupling.

The first and second directional couplers 134, 135 are configured as 2×2 couplers in one embodiment.

The first arm 140 includes the first waveguide 142, a first member 144 having a first bonding region 146, and a first thermo-optic phase shifter 148. The second arm 160 includes the second waveguide 162, a second member 164 having a second bonding region 166, and a second thermo-optic phase shifter 168. The first and second members 144, 164 are fabricated from magneto-optic material, e.g., a magneto-optical garnet such as CeYIG, which may be in the form of $(CeY)_3Fe_5O_{12}$. The magneto-optic material may be used as a cladding layer.

The first waveguide 142 is bonded onto the first member 144 at the first bonding region 146, and the second waveguide 162 is bonded onto the second member 164 at the second bonding region 166. The first bonding region 146 of the first waveguide 142 has a first characteristic length 150 that is non-reciprocal in the sense that it imposes different phase on the light depending on propagation direction similar to the second characteristic length 170 that is associated with the second bonding region 166 of the second waveguide 162.

The first and second thermo-optic phase shifters 148, 168 include heater elements that are fabricated and arranged alongside the bonded magneto-optic material of the first and second members 144, 164 so as to not affect the bonding of the first and second waveguides 142, 162 to the magneto-optic material.

One or a plurality of metal pads 136 are disposed on the substrate 120 and support the first waveguide 142 and/or the second waveguide 162.

The first thermo-optic phase shifter 148 is arranged on the first member 144 and collocated with the first waveguide 142. The second thermo-optic phase shifter 168 is arranged on the second member 164 and collocated with the second waveguide 162. A third thermo-optic phase shifter 173 is implemented on the first waveguide 142 to effect fine tuning of reciprocal phase shift.

The magneto-optic material of the first member 144 and the first thermo-optic phase shifter 148 of the first arm 140 cause a first phase shift in a first light beam travelling through the first waveguide 142, and the magneto-optic material of the second member 164 and the second thermo-optic phase shifter 168 of the second arm 160 cause a second phase shift in a second light beam travelling through the second waveguide 162. However, the first bonding region 146 is larger than the second bonding region 166, causing the first and second phase shifts to be different by design.

The magneto-optic material of the first member 144 and the magneto-optic material of the second member 164 apply magnetic fields in anti-parallel directions. The magnetic field may be generated externally. The magnetic field 152, 172 may be generated on the first and second arms 140, 160 employing an electro-magnet in one embodiment. Alternatively, the magnetic field may be generated by doping or depositing permanent magnetic materials on top of the magneto-optic material of the first and second members 144, 164.

The design of the photonic circulator 130 incorporates a bonded CeYIG layer in such manner to minimize losses while maintaining the ability to independently vary the non-reciprocal characteristic lengths. Non-reciprocal propagation of light in the first and second arms 140, 160 may be achieved using a non-reciprocal phase shift of a guided wave in a silicon photonic waveguide with magneto-optic material used as upper cladding. When placing a magneto-optic material, e.g. CeYIG, on top of the photonic circulator 130, a trade-off may be made between propagation losses and the non-reciprocal phase shift. As described herein part-to-part variations may be minimized with a phase shifter that does not affect the bonding of magneto-optic material.

When a light beam is input, e.g., from a left side as shown, and is routed into the first and second arms 140, 160 of the photonic circulator 130 after passing through a 50/50 directional coupler or multi-mode interferometer (MMI). Each bonded CeYIG stripe is shared with two devices and the direction of the externally applied magnetic field is in such a way that the propagation in upper and lower arms will experience different phase shift with a non-reciprocal phase shift. This design allows for the magneto-optic material to be bonded on a section of the photonic circulator 130 that the non-reciprocal phase shift is intended, thus minimizing optical losses. The light also experiences reciprocal phase shift. Since the photonic circulator 130 is unbalanced, the characteristic reciprocal phase shift can be chosen in such a way that, when accompanied with non-reciprocal counterpart, there is constructive or destructive interference at the second, output coupler 135, depending on the direction of propagation. Depending on the overlap of the CeYIG layer with the waveguide and the intensity of the magnetic field in that region, the effective non-reciprocal length may be different than intended. To compensate for such variations, as was noted above, thermal phase shifters are incorporated in the design. This is because the metal contacts to the phase shifters are at the two ends and can be pulled out of the areas where CeYIG layer is bonded. An additional phase shifter 173 may be employed to tune the reciprocal phase. The phase shifters mentioned here will have the phase-shifting body, which is preferably a doped silicon strip waveguide, at the same layer and will have same height as the silicon strip waveguide without a metal overlayer at regions where the magneto-optic material is bonded. The metal contacts therefore will be outside of magneto-optic material and will not affect the bonding process.

Figure 3:
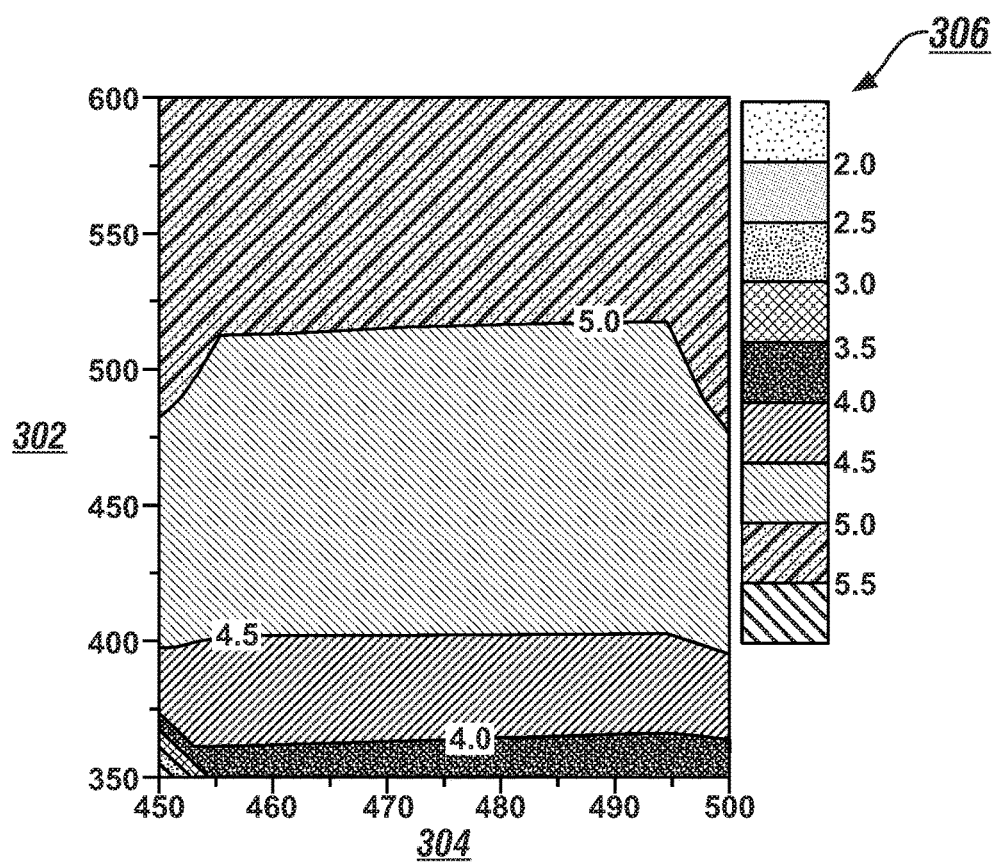
FIG. 3 graphically illustrates a non-reciprocal phase shift for a waveguide in relation to a waveguide width and a magneto-optic material layer thickness, in accordance with the disclosure.

FIG. 3 graphically illustrates a non-reciprocal phase shift for a waveguide, shown for a 220 nm thick silicon waveguide, with waveguide width (nm) 302 (depicted on a vertical axis) in relation to a CeYIG layer thickness (nm) 304 (depicted on a horizontal axis). The non-reciprocal phase shift is indicated by the legend 306. Faraday rotation in the cladding is assumed to be 3800 degrees/cm for this calculation and is based on a measured bulk value. The non-reciprocal phase shift ranges between 2.0 and 5.5, as indicated by the legend 306. The results indicate that, at least for some regions, the non-reciprocal phase shift is insensitive to a change in the CeYIG layer thickness (nm) 304, but is directly affected by a change in the waveguide width (nm) 302.

The CeYIG material layer enables high device performance, providing high transparency and high saturation Faraday rotation at telecommunication wavelengths (1550 nm and 1310 nm). Example requirements for the photonic circulator include a high isolation ratio (>20 dB), low insertion loss (<1 dB), broadband operation (several tens of nm), and temperature stability between −45 C and 85 C.

Figure 4:
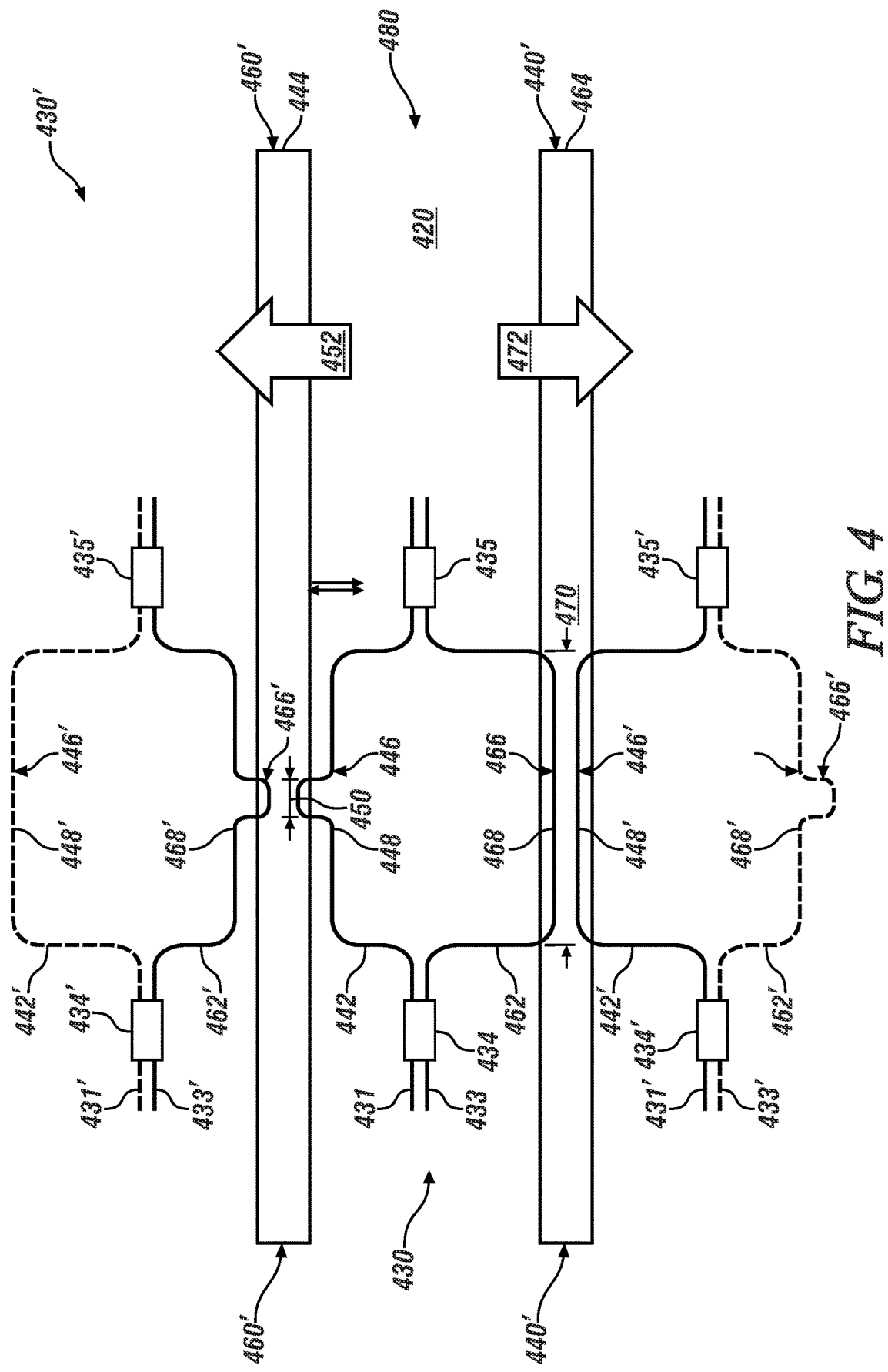
FIG. 4 schematically illustrates first and second photonic circulators that are configured as an asymmetric Mach-Zehnder interferometers and that enable sharing of first and second members that are fabricated from magneto-optic material.

FIG. 4 schematically illustrates first and second photonic circulators 430, 430', respectively, which is an embodiment of the photonic circulator 30 that is described with reference to FIG. 1, and is configured as an integrated photonic component that separates optical signals that travel in opposite directions in integrated photonic circuits, i.e., an optical waveguide. The first and second photonic circulators 430, 430' are implemented on a silicon substrate 420, and are configured as an asymmetric Mach-Zehnder interferometer in one embodiment. This arrangement of the first and second photonic circulators 430, 430' enables sharing of first and second members 444, 464 that are fabricated from magneto-optic material. Elements represented by dashed lines indicate portions that are folded over and interact with the opposed magnetic arms.

The first photonic circulator 430 includes a first port 431, a second port 432, a third port 433, a first directional coupler 434, a second directional coupler 435, a first arm 440 including a first waveguide 442, and a second arm 460 including a second waveguide 462 that are arranged on or otherwise disposed on the silicon substrate 420. The first and second waveguides 442, 462 are routed in parallel through each of the first and second directional couplers 434, 435. The elements of the first photonic circulator 430 are arranged such that light coupled to first port 431 appears in second port 432 while the light coupled to the second port 432 appears in the third port 433 with minimal leakage and cross-port coupling. The first and second directional couplers 434, 435 are configured as 2×2 couplers in one embodiment.

The first arm 440 includes the first waveguide 442, a first member 444 having a first bonding region 446, and a first thermo-optic phase shifter 448. The second arm 460 includes the second waveguide 462, a second member 464 having a second bonding region 466, and a second thermo-optic phase shifter 468. The first and second members 444, 464 are fabricated from magneto-optic material, e.g., CeYIG. The magneto-optic material may be used as a cladding layer.

The first waveguide 442 is bonded onto the first member 444 at the first bonding region 446, and the second waveguide 462 is bonded onto the second member 464 at the second bonding region 466. The first bonding region 446 of the first waveguide 442 has a first characteristic length 450 that is non-reciprocal in the sense that it imposes a different phase on the light depending on propagation direction similar to a second characteristic length 470 that is associated with the second bonding region 466 of the second waveguide 462.

The first and second thermo-optic phase shifters 448, 468 include heater elements that are fabricated and arranged alongside the bonded magneto-optic material of the first and second members 444, 464 so as to not affect the bonding of the first and second waveguides 442, 462 to the magneto-optic material.

The first thermo-optic phase shifter 448 is arranged on the first member 444 and collocated with the first waveguide 442. The second thermo-optic phase shifter 468 is arranged on the second member 464 and collocated with the second waveguide 462.

The magneto-optic material of the first member 444 and the first thermo-optic phase shifter 448 of the first arm 440 cause a first phase shift in a first light beam travelling through the first waveguide 442, and the magneto-optic material of the second member 464 and the second thermo-optic phase shifter 468 of the second arm 460 cause a second phase shift in a second light beam travelling through the second waveguide 462. However, the first bonding region 446 is larger than the second bonding region 466, causing the first and second non-reciprocal phase shifts to be different by design.

The magneto-optic material of the first arm 440 and the magneto-optic material of the second arm 460 apply magnetic fields in anti-parallel directions. The magnetic field may be generated externally. The magnetic field 452, 472 may be generated on the first and second arms 440, 460 employing an electro-magnet in one embodiment. Alternatively, the magnetic field may be generated by doping or depositing permanent magnetic materials on top of the magneto-optic material of the first and second members 444, 464.

The second photonic circulator 430' includes a first port 431', a second port 432', a third port 433', a first directional coupler 434', a second directional coupler 435', a first arm 440' including a first waveguide 442', and a second arm 460' including a second waveguide 462', all of which are arranged on or otherwise disposed on the silicon substrate 420. The first and second waveguides 442', 462' are routed in parallel through each of the first and second directional couplers 434', 435'. The elements of the second photonic circulator 430' are arranged such that light coupled to a first port 431' appears in second port 432' while the light coupled to the second port 432' appears in the third port 433' with minimal leakage and cross-port coupling. The first and second directional couplers 434', 435' are configured as 2×2 couplers in one embodiment.

The first arm 440' includes the first waveguide 442', the second member 464 having a first bonding region 446', and a first thermo-optic phase shifter 448'. The second arm 460' includes the second waveguide 462', the first member 444 having a second bonding region 466', and a second thermo-optic phase shifter 468'.

The first waveguide 442' is bonded onto the second member 464 at the first bonding region 446', and the second waveguide 462' is bonded onto the first member 444 at the second bonding region 466'. The first bonding region 446' of the first waveguide 442' has a first characteristic length (not shown) that is non-reciprocal in the sense that it imposes different phase on the light depending on propagation direction similar to a second characteristic length (not shown) that is associated with the second bonding region 466' of the second waveguide 462'.

The first and second thermo-optic phase shifters 448', 468' include heater elements that are fabricated and arranged alongside the bonded magneto-optic material of the first and second members 444, 464 so as to not affect the bonding of the first and second waveguides 442', 462' to the magneto-optic material. The first thermo-optic phase shifter 448' is arranged on the second member 464 and the second thermo-optic phase shifter 468 is arranged on the first member 444. The magneto-optic material of the first arm 440 and the magneto-optic material of the second arm 460 apply magnetic fields 452, 472 in anti-parallel directions. The magnetic field may be generated externally. The magnetic fields 452, 472 may be generated on the first and second arms 440, 460 employing an electro-magnet in one embodiment. Alternatively, the magnetic field may be generated by doping or depositing permanent magnetic materials on top of the magneto-optic material of the first and second members 444, 464.

The laser 10, the transmit optical splitter 20, the photonic circulator 30, the photodetector 40, and the optical phased array 50 are arranged on a single semiconductor device. This includes the laser 10, the transmit optical splitter 20, the photodetector 40, and the optical phased array 50 being arranged on a silicon integrated photonic platform that is fabricated from mixed silicon and silicon nitride in one embodiment, with a feedback circuit providing for wavelength control and stabilization.

Figure 5:
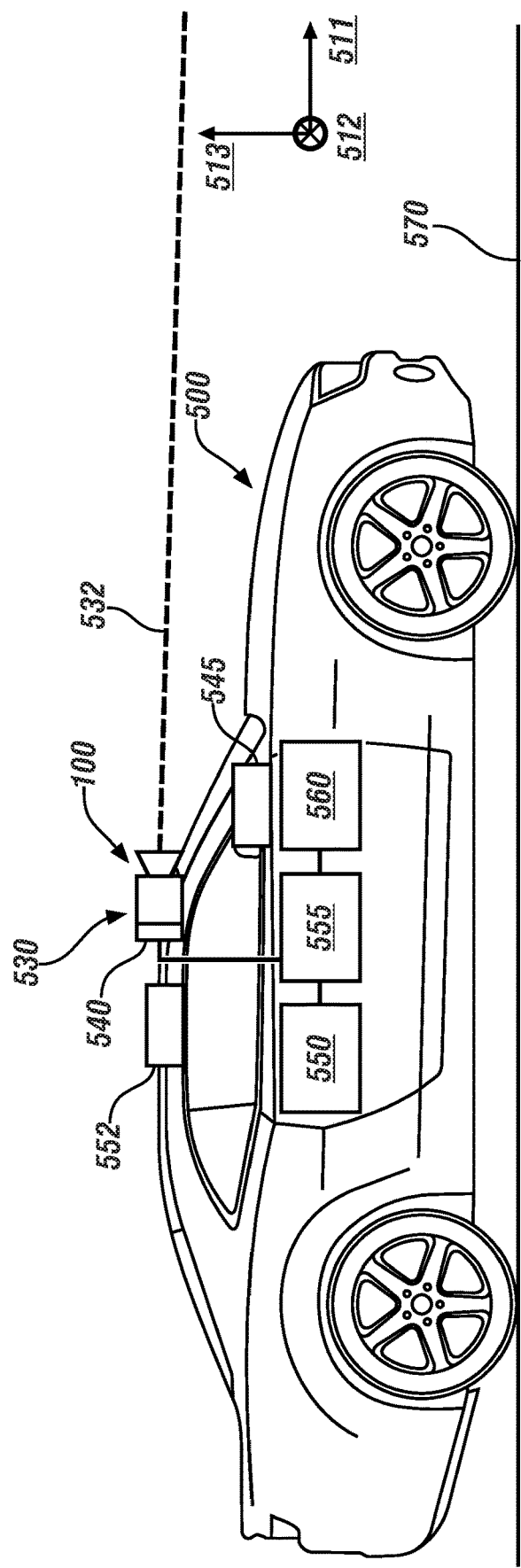
FIG. 5 schematically illustrates an embodiment of a LiDAR device, wherein the LiDAR sensor is an element of a spatial monitoring system that is disposed on a vehicle to monitor a field of view, in accordance with the disclosure.

FIG. 5 schematically illustrates a vehicle 500 that employs a LiDAR system 530 that includes an embodiment of the LiDAR device 100 that is described with reference to FIG. 1. In one embodiment, and as described herein, the LiDAR system 530 is an element of a spatial monitoring system 540 including a spatial monitoring controller 555 that is disposed on the vehicle 500. The concepts described herein may be employed on various systems that may benefit from information determined from an embodiment of the LiDAR system 530.

A side-view of the vehicle 500 is shown, which is disposed on and able to traverse a travel surface 570 such as a paved road surface. The vehicle 500 and the travel surface 570 define a three-dimensional coordinate system including a longitudinal axis 511, a lateral axis 512 and an attitudinal axis 513. The longitudinal axis 511 is defined as being equivalent to a direction of travel of the vehicle 500 on the travel surface 570. The lateral axis 12 is defined as being equivalent to orthogonal to the direction of travel of the vehicle 500 on the travel surface 570. The attitudinal axis 513 is defined as being orthogonal to a plane defined by the longitudinal axis 511 and the lateral axis 512, i.e., as projecting perpendicular to the travel surface 570.

The LiDAR system 530 is disposed on the vehicle 500 to monitor a viewable region 532 that is proximal to the vehicle 500. In one embodiment, the viewable region 532 is forward of the vehicle 500. The vehicle 500 may also include a vehicle controller 550, a global navigation satellite system (GNSS) sensor 552, a human/machine interface (HMI) device 545. The LiDAR system 530 employs a pulsed and reflected laser beam to measure range or distance to an object. When employed in combination with information from the GNSS sensor 552, the spatial monitoring controller 555 is able to determine geospatial locations of objects that are in the viewable region 532 of the vehicle 500.

Other on-vehicle systems may include, by way of non-limiting examples, an on-board navigation system, a computer-readable storage device or media (memory) that includes a digitized roadway map, an autonomous control system, an advanced driver assistance system, a telematics controller, etc., all of which are indicated by controller 560. The vehicle 500 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The spatial monitoring system 540 may include other spatial sensors and systems that are arranged to monitor the viewable region 532 forward of the vehicle 500 including, e.g., a surround-view camera, a forward-view camera, and a radar sensor, which may be employed to supplement or complement spatial information that is generated by the LiDAR system 530. Each of the spatial sensors is disposed on-vehicle to monitor all or a portion of the viewable region 532 to detect proximate remote objects such as road features, lane markers, buildings, pedestrians, road signs, traffic control lights and signs, other vehicles, and geographic features that are proximal to the vehicle 500. The spatial monitoring controller 55 generates digital representations of the viewable region 532 based upon data inputs from the spatial sensors. The spatial monitoring controller 555 can evaluate inputs from the spatial sensors to determine a linear range, relative speed, and trajectory of the vehicle 500 in view of each proximate remote object. The spatial sensors can be located at various locations on the vehicle 500, including the front corners, rear corners, rear sides and mid-sides. The spatial sensors can include a front radar sensor and a camera in one embodiment, although the disclosure is not so limited. Placement of the spatial sensors permits the spatial monitoring controller 555 to monitor traffic flow including proximate vehicles, intersections, lane markers, and other objects around the vehicle 500. Data generated by the spatial monitoring controller 555 may be employed by a lane marker detection processor (not shown) to estimate the roadway. As employed herein, the terms "proximate", "proximal" and related terms refer to stationary and mobile objects that are in the vicinity of the vehicle 500 such that they are discernible by one or more of the spatial sensors connected to the spatial monitoring controller 55 including the LiDAR system 530.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which can be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions.

Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A photonic circulator for a chip-scale LiDAR device, comprising:
    a first arm including a first waveguide bonded onto a first member at a first bonding region, and a second arm including a second waveguide bonded onto a second member at a second bonding region, wherein the first bonding region of the first waveguide has a first characteristic length that is non-reciprocal to and is different from a second characteristic length associated with the second bonding region of the second waveguide, wherein the second waveguide is non-reciprocal;
    a first thermo-optic phase shifter arranged on the first member and collocated with the first waveguide;
    a second arm separated from the first arm and including a second thermo-optic phase shifter arranged on the second member and collocated with the second waveguide;
    a metal pad/contact; and
    a first directional coupler and a second directional coupler;
    wherein the first member and the second member are fabricated from a magneto-optic material;
    wherein the magneto-optic material and the first thermo-optic phase shifter of the first member cause a first phase shift in a first light beam travelling through the first waveguide; and
    wherein the magneto-optic material and the second thermo-optic phase shifter of the second member cause a second phase shift in a second light beam travelling through the second waveguide.

2. The photonic circulator of claim 1, wherein magneto-optic material is bonded to only cover a portion of the first waveguide and a portion of the second waveguide whereat the direction of propagation of light is perpendicular to an external magnetic field that is exerted in plane with the magneto-optical material.

3. The photonic circulator of claim 1, wherein the first and second phase shifters are incorporated to fine tune the first and second phase shifts under the bonded magneto-optic material and wherein the metal contacts are located outside of the bonding region.

4. The photonic circulator of claim 1, wherein the first and second phase shifts are non-reciprocal.

5. The photonic circulator of claim 1, wherein the first arm including the first waveguide bonded onto the first member at the first bonding region and the second arm including the second waveguide bonded onto the second member at the second bonding region comprise an asymmetric Mach-Zehnder interferometer.

6. The photonic circulator of claim 1, wherein the first bonding region is larger than the second bonding region.

7. The photonic circulator of claim 1, wherein the first waveguide comprises a silicon photonic waveguide including magneto-optic material employed as upper cladding thereon.

8. The photonic circulator of claim 1, wherein the magneto-optic material comprises a magneto-optical garnet that is employed as a cladding layer material.

9. The photonic circulator of claim 8, wherein the magneto-optical garnet comprises $(CeY)_3Fe_5O_{12}$.

10. The photonic circulator of claim 1, wherein the magneto-optic material of the first member and the magneto-optic material of the second member apply magnetic fields in anti-parallel directions.

11. The photonic circulator of claim 1, wherein the magnetic field is generated externally employing an electromagnet.

12. The photonic circulator of claim 1, wherein the magnetic field is generated by depositing permanent magnetic materials on top of the magneto-optic material.

13. A light detection and ranging (LiDAR) device, comprising:
    a laser, a transmit optical splitter, a photonic circulator, a photodetector, and an optical phased array;
    wherein the laser, the transmit optical splitter, the photonic circulator, the photodetector, and the optical phased array are arranged as a chip-scale package on a single semiconductor device;
    wherein the laser generates a first light beam that is transmitted to an aperture of the optical phased array via the transmit optical splitter, the photonic circulator, and the optical phased array;
    wherein the first light beam is transmitted to the photodetector via the transmit optical splitter;
    wherein the aperture of the optical phased array captures a second light beam that is transmitted to the photodetector via the optical phased array and the photonic circulator; and
    wherein the photonic circulator includes:
        a first arm including a first waveguide bonded onto a first member at a first bonding region, and a second arm including a second waveguide bonded onto a second member at a second bonding region, wherein the first bonding region of the first waveguide has a first characteristic length that is non-reciprocal to and is different from a second characteristic length associated with the second bonding region of the second waveguide, wherein the second waveguide is non-reciprocal, a first thermo-optic phase shifter arranged on the first member and collocated with the first waveguide, the second arm separated from the first arm and including a second thermo-optic phase shifter arranged on the second member and collocated with the second waveguide;

including a second thermo-optic phase shifter arranged on the second member and collocated with the second waveguide;

a metal pad/contact, and a first directional coupler and a second directional coupler;

wherein the first member and the second member are fabricated from a magneto-optic material, wherein the magneto-optic material and the first thermo-optic phase shifter of the first member cause a first phase shift in a first light beam travelling through the first waveguide, and wherein the magneto-optic material and the second thermo-optic phase shifter of the second member cause a second phase shift in a second light beam travelling through the second waveguide.

14. The LiDAR device of claim 13, wherein the laser comprises a widely tunable fully-integrated narrow linewidth master laser.

15. The LiDAR system of claim 13, wherein the laser comprises a scanning frequency modulated continuous wave (FMCW) LiDAR device.

16. The LiDAR device of claim 13, further comprising a trans-impedance amplifier in communication with the transmit photodetector and the receive photodetector.

17. The LiDAR device of claim 13, wherein the optical phased array comprises a set of optical splitters, a plurality of optical amplifiers, a plurality of phase shifters, and a plurality of optical antennas and the aperture.

18. The LiDAR device of claim 13, wherein the laser, the transmit optical splitter, the optical circulator, the photodetector, and the optical phased array being arranged on a single semiconductor device comprises the laser, the transmit optical splitter, the photonic circulator, the photodetector, and the optical phased array being arranged on a silicon integrated photonic platform including mixed silicon and silicon nitride.

19. The LiDAR device of claim 13, further comprising a third thermo-optic phase shifter arranged on the first member.

* * * * *